(12) United States Patent
Longshore et al.

(10) Patent No.: US 6,212,363 B1
(45) Date of Patent: Apr. 3, 2001

(54) METHOD AND APPARATUS FOR SIGNALLING INTERFERENCE PROTECTION IN A CHANNEL REUSE RADIO NETWORK

(75) Inventors: Theodore F. Longshore, Hoffman Estates; William Paul DeClerck, Palatine, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/303,556

(22) Filed: Sep. 9, 1994

Related U.S. Application Data

(63) Continuation of application No. 07/731,386, filed on Jul. 17, 1991, now abandoned, which is a continuation of application No. 07/442,955, filed on Nov. 29, 1989, now abandoned.

(51) Int. Cl.[7] .................................................. H04B 15/00
(52) U.S. Cl. .............................................. 455/53; 455/447
(58) Field of Search ................................ 455/32.1, 33.1, 455/33.2, 33.4, 34.1, 34.2, 56.1, 54.1, 54.2, 62, 63, 67.3, 70, 447; 370/95.3; 379/58, 59, 60, 63

(56) References Cited

U.S. PATENT DOCUMENTS

| | | | |
|---|---|---|---|
| 4,128,740 | 12/1978 | Graziano . | |
| 4,345,334 | * 8/1982 | Nordahl | 455/63 |
| 4,500,984 | * 2/1985 | Shimbo et al. | 455/63 |
| 4,654,867 | * 3/1987 | Labedz et al. | 379/60 |
| 4,677,653 | * 6/1987 | Weiner et al. | 379/59 |
| 4,696,027 | * 9/1987 | Bonta | 379/60 |
| 4,754,453 | * 6/1988 | Eizenhofer | 379/63 |
| 4,850,030 | * 7/1989 | Hashimoto et al. | 455/34 |
| 4,850,033 | * 7/1989 | Eizenhofer et al. | 455/34 |
| 4,876,740 | * 10/1989 | Levine et al. | 379/63 |
| 4,914,651 | * 4/1990 | Lusignan | 379/59 |

FOREIGN PATENT DOCUMENTS

| | | | |
|---|---|---|---|
| 55-93335 | * 7/1980 | (JP) | 455/34 |
| 1170232 | * 7/1989 | (JP) | 455/34 |

* cited by examiner

*Primary Examiner*—Nguyen Vo
(74) *Attorney, Agent, or Firm*—F. John Motsinger; Richard A. Sonnetag

(57) ABSTRACT

There is provided a mechanism for signalling interference protection comprising: transmitting, along with adjacent channel frequencies, an odd/even bit associated with odd/even channels that differentiates adjacent channel frequencies from one another, receiving transmitted an odd/even bit associated with odd/even channels that differentiates adjacent channel frequencies from one another, and responding to one(s) of interest while remaining unresponsive to other than that of interest.

6 Claims, 2 Drawing Sheets

METHOD AND APPARATUS FOR SIGNALLING INTERFERENCE PROTECTION IN A CHANNEL REUSE RADIO NETWORK

This continuation of application Ser. No. 07/731,386 filed Jul. 17, 1991 and now abandoned which is a continuation of application Ser. No. 07/442,955, filed Nov. 29, 1989 and now abandoned.

THE FIELD OF INVENTION

This invention is concerned with signalling interference protection.

More particularly, this invention is concerned with signalling interference protection in a (cellular radiotelephone) channel reuse network.

BACKGROUND OF THE INVENTION

In systems employing channel reuse schemes, it is a common problem to determine whether one is using the channel intended or an unintended reuse of that channel. In cellular radiotelephone systems exhibiting geographical frequency reuse, the problem is worse because cellular radiotelephones are not fully capable of rejecting not only the same frequency reused at the geographic separation distance, but also insufficiently capable of rejecting adjacent frequencies within the reuse perimeter. U.S. Pat. No. 4,128,740 to Graziano, assigned to the instant assignee, is useful to demonstrate the point. FIG. 4 of Graziano (substantially reproduced here as FIG. 1) illustrates a conventional cellular frequency reuse plan commonly known as the seven-cell repeat pattern. It consists of a central cell (1) ringed in a clockwise direction beginning at 3-o'clock by six ring cells (2–7), completing a seven-cell pattern. That seven-cell pattern is then itself surrounded by six other identical seven-cell patterns. Thus, the frequencies operating in each cell are geographically reused at a geographical reuse separation distance. It is this geographical frequency reuse that provides the (frequency) channel capacity to allow a large number of radiotelephone users to share a limited amount of (frequency) spectrum. However, the neat geographical reuse separation illustrated is not quite so neat when local propagation conditions such as antenna height, buildings and obstructions, etc., are taken into account. Accordingly, additional protection is provided against co-channel (same frequency) interference in the signalling by allocating seven differentiating codes to each of the surrounding patterns. This signalling provides some protection in that a radiotelephone is able to differentiate the frequency on which he is speaking from an interferer of the same frequency at the reuse separation distance but having a different code. In conventional analog cellular systems, these codes are Supervisory Audio Tones (SAT) and in proposed narrower band, split-channel systems, known as Digital SAT or DSAT.

The problem solved by the instant invention is that there is insufficient rejection in radiotelephones to fully reject adjacent channels just one frequency above or below the one of interest.

In his patent (U.S. Pat. No. 4,128,740), Graziano teaches that greater frequency reuse (and therefore spectrum utilization) can be obtained with narrow beam, sectored antennas. The resulting four-cell pattern is still surrounded by six reuses of that same four cell pattern, advantageously employing seven DSATs for improved signalling protection against co-channel interference. FIG. 9 of Graziano (substantially reproduced here as FIG. 2) illustrates a frequency plan for his "four-cell" pattern. It illustrates how 208 frequency channels are divided among 4 cells, each having 6 sectors, for a total of 24 sectors (CS1–CS24). Thus, each sector has one supervisory frequency (S1–S24) and either 7 or 8 voice frequency channels, allowing many simultaneous conversations in each sector. The problem is that, although any given frequency being used in Sector 3 of a first pattern can be differentiated from that same co-channel frequency in Sector 3 of the pattern behind it by its DSAT, there is no protection for a radiotelephone user in Sector 3 using frequency 196 from the next higher adjacent frequency 197 directly behind it in Sector 4, or from the next lower adjacent frequency 195 in Sector 2 behind and to the side of it.

This invention takes as its object to overcome these shortcomings and to realize certain advantages presented below.

SUMMARY OF THE INVENTION

There is provided a method and apparatus for signalling interference protection comprising: transmitting, in, inter alia, adjacent channel frequencies, an odd/even bit associated with odd/even channels that differentiates adjacent channel frequencies from one another, receiving transmitted an odd/even bit associated with odd/even channels that differentiates adjacent channel frequencies from one another, and responding to one(s) of interest while remaining unresponsive to other than that of interest.

DESCRIPTION OF THE DRAWINGS

Additional objects, features and advantages of the invention will be more clearly understood and the best mode contemplated for practicing it in its preferred embodiment will be appreciated (by way of unrestricted example) from the following detailed description, taken together with the accompanying drawings in which.

DETAILED DESCRIPTION

Figure 1:
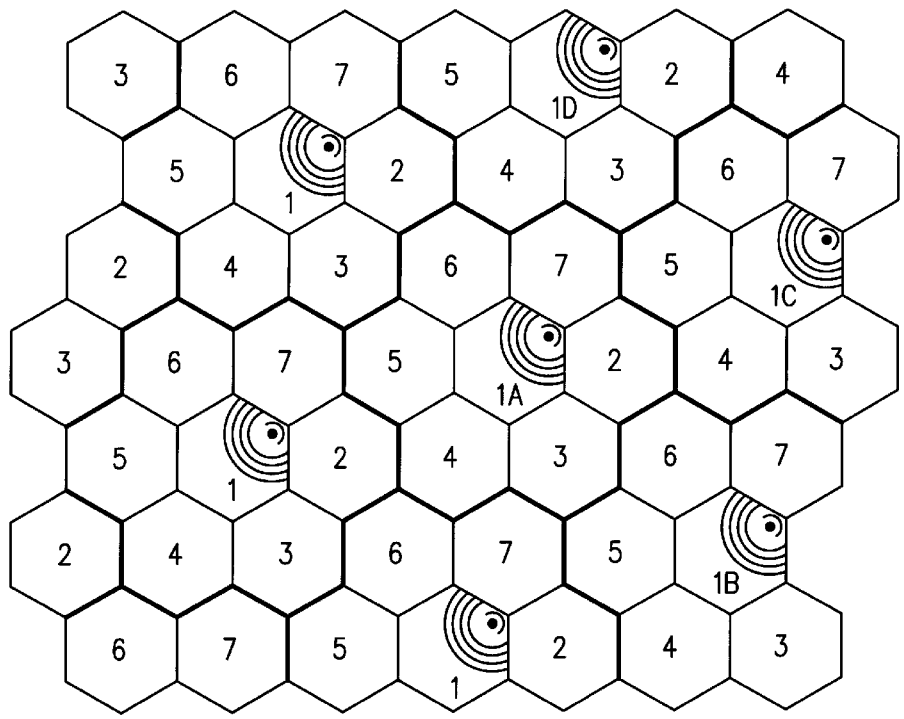
FIG. 1 is a cellular geographical reuse diagram which is a substantial reproduction of FIG. 4 of U.S. Pat. No. 4,128,740 to Graziano, assigned in the instant assignee.
Figure 3:
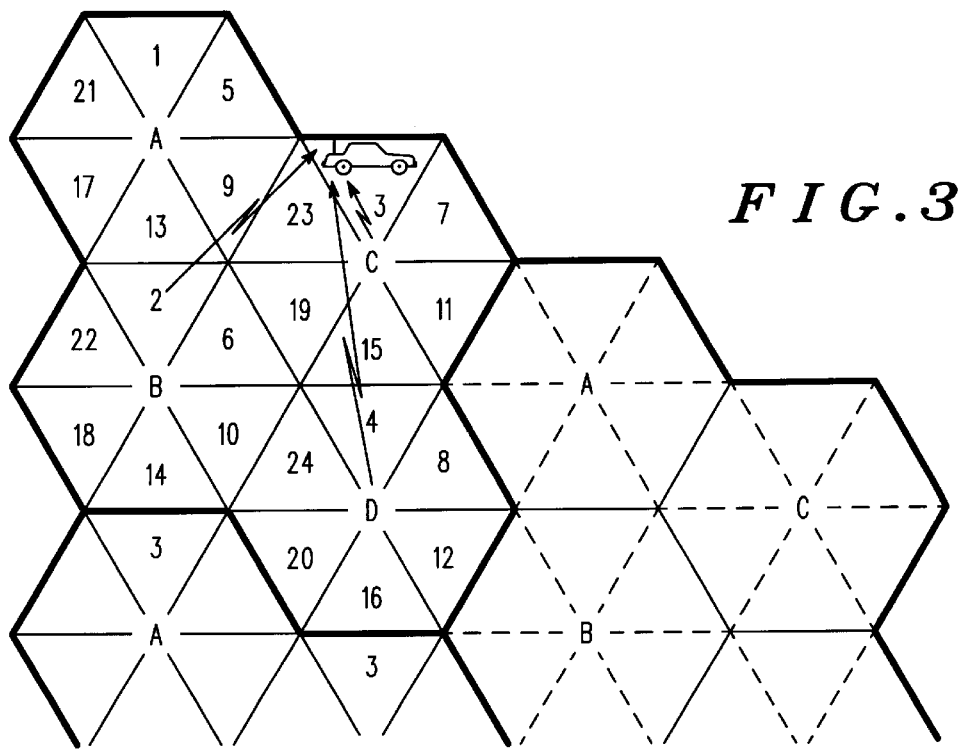
FIG. 3 is a cellular geographical reuse diagram and cellular frequency reuse plan of the network in which the invention operates in accordance with the preferred embodiment.
Figure 2:
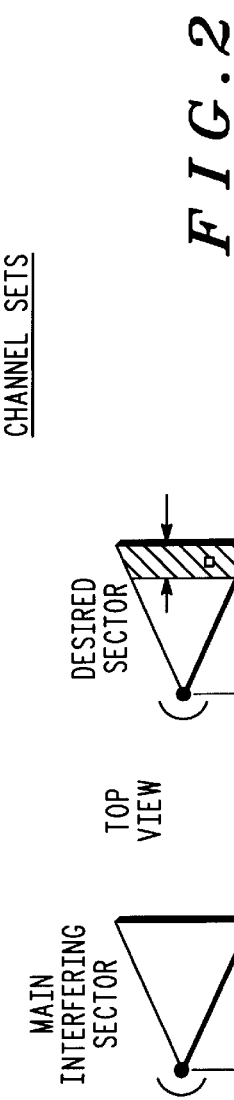
FIG. 2 is a cellular frequency reuse plan which is a substantial reproduction of FIG. 9 of U.S. Pat. No. 4,128,740 to Graziano, assigned in the instant assignee.

FIG. 3 is a cellular geographical reuse diagram and cellular frequency reuse plan of the network in which the invention operates in accordance with the preferred embodiment. In the preferred embodiment, the network implements a four-cell (A–D) reuse pattern having six sectors per cell (thus, sectors 1–24).

Once again, the problem illustrated in FIG. 3 is that, although any given frequency being used in Sector 3 of a first pattern of a mobile radiotelephone subscriber can be differentiated from that same co-channel frequency in Sector 3 of the pattern behind it by its DSAT, there is no protection for a radiotelephone user in Sector 3 using frequency 196 from the next higher adjacent frequency 197 directly behind it in Sector 4, or from the next lower adjacent frequency 195 in Sector 2 behind and to the side of it. Present systems simply do not provide protection against the most likely source of interference, an adjacent channel within its own pattern.

The instant invention provides a solution to the problem by utilizing the signalling to provide additional interference protection, not from co-channel (same frequency) interferers at the geographic reuse separation distance but from adjacent channels within the same pattern. It provides that radiotelephone receivers (and base cell site equipment) reject adjacent interferers on the basis of evenness and oddness of the frequency. For example, if a mobile radiotelephone subscriber in Sector 3 is assigned nominal channel frequency 196 (actual frequency abc.xyz MHz)—an "even" channel, his receiver would reject adjacent channel frequency 197 (actually some 12.5, 15, 25 or 30 KHz higher) in Sector 4 directly behind and channel frequency 195 (actually some 12.5, 15, 25 or 30 KHz below) in Sector 2 behind and to the side, based upon their "oddness". This substantially reduces the possibility of a receiver improperly acting upon a transmission intended for another on an adjacent channel.

If "evenness" and "oddness" were not otherwise determinable (and inherently associated with each carrier), a bit could be transmitted along with each carrier frequency to indicate "evenness" and "oddness" as by either setting or clearing that bit field. Similarly, if additional protection from interferers were desired, a one-of-n state binary word could be included in the signalling protocol for each of n partitions of the frequency spectrum. However, the usual distance 5 BCH code provides sufficient assurance that the single bit will be recoverable.

The attendant advantage of this invention clearly includes signalling protection against adjacent channel interferers within the pattern in addition to the usual SAT co-channel interference protection from outside the pattern.

Thus, there has been provided a mechanism for signalling interference protection comprising: transmitting, in, inter alia, adjacent channel frequencies, an odd/even bit associated with odd/even channels that differentiates adjacent channel frequencies from one another, receiving transmitted an odd/even bit associated with odd/even channels that differentiates adjacent channel frequencies from one another, and responding to one(s) of interest while remaining unresponsive to other than that of interest.

It will be appreciated by those ordinarily skilled in the art that the means for carrying out the invention are readily available and their operation well understood. The radio apparatus of, for example, Levine et al. (U.S. Pat. No. 4,876,740) and Levine (U.S. Pat. No. 4,649,543), operated in accordance herewith would constitute the subject matter of the apparatus claims of the present invention. While the preferred embodiment of the invention has been described and shown, it will be appreciated by those skilled in this field that other variations and modifications of this invention may be implemented. For example, "evenness" and "oddness" could be determined from frequency discrimination (channel spacing) or made inherent to the channels through slight variations in the bit rates used on "odd" versus "even" channels. Although the foregoing discussion has included a discussion in terms of channel frequencies, the technique is equally applicable to other channel structures such as, time slot channels or code division channels and the like.

These and all other variations and adaptations are expected to fall within the ambit of the appended claims.

What we claim and desire to secure by Letters Patent is:

1. A method of adjacent voice channel interference protection, the method comprising the steps of:

transmitting, in adjacent voice channels, an odd/even bit associated with odd/even voice channels that differentiates adjacent voice channels from one another, receiving the transmitted odd/even bit associated with odd/even voice channels differentiating adjacent voice channels from one another, and responding only to a desired one of the adjacent voice channels based on the odd/even bit associated with the desired adjacent voice channel.

2. A method of adjacent voice channel interference protection, the method comprising the steps of:

transmitting, in voice channels having adjacent frequencies, an odd/even bit associated with odd/even frequencies that differentiates adjacent voice channel frequencies from one another, receiving the transmitted odd/even bit associated with odd/even frequencies differentiating adjacent voice channel frequencies from one another, and responding only to a voice channel at a desired frequency based on the odd/even bit associated with the voice channel at the desired frequency.

3. An apparatus for providing adjacent voice channel interference protection comprising, operatively coupled in series:

means for transmitting, in adjacent voice channels, an odd/even bit associated with odd/even voice channels that differentiates adjacent voice channels from one another, means for receiving the transmitted odd/even bit associated with odd/even voice channels differentiating adjacent voice channels from one another, and means for responding only to a desired one of the adjacent voice channels based on the odd/even bit associated with the desired adjacent voice channel.

4. An apparatus for providing adjacent voice channel interference protection comprising, operatively coupled in series:

means for transmitting, in voice channels having adjacent frequencies, an odd/even bit associated with odd/even frequencies that differentiates adjacent voice channel frequencies from one another, means for receiving the transmitted odd/even bit associated with odd/even frequencies differentiating adjacent voice channel frequencies from one another, and means for responding only to a voice channel at a desired frequency based on the odd/even bit associated with the voice channel at the desired frequency.

5. In a radio network, a method comprising the steps of:

transmitting, in odd/even voice channels, an odd/even bit associated with the odd/even voice channels that differentiates the odd and even voice channels from one another, receiving the transmitted odd/even bit associated with the odd/even voice channels differentiating the odd and even voice channels from one another, and responding to a desired one of the odd or even voice channels based on reception of the odd/even bit associated therewith.

6. The method of claim 5 wherein the step of responding further comprises the steps of responding to an odd voice channel upon reception of an odd bit and rejecting adjacent even voice channels based on their associated even bits, and vice versa.

* * * * *